(12) United States Patent
Zhang et al.

(10) Patent No.: US 11,827,577 B2
(45) Date of Patent: Nov. 28, 2023

(54) PREPARATION METHOD OF CARBON-BASED SELENIUM-ENRICHED FERTILIZER FOR RICE

(71) Applicant: China National Rice Research Institute, Hangzhou (CN)

(72) Inventors: Yikai Zhang, Hangzhou (CN); Huizhe Chen, Hangzhou (CN); Yuping Zhang, Hangzhou (CN); Jing Xiang, Hangzhou (CN); Yaliang Wang, Hangzhou (CN)

(73) Assignee: CHINA NATIONAL RICE RESEARCH INSTITUTE, Hangzhou (CN)

( * ) Notice: Subject to any disclaimer, the term of this patent is extended or adjusted under 35 U.S.C. 154(b) by 215 days.

(21) Appl. No.: 17/180,728

(22) Filed: Feb. 20, 2021

(65) Prior Publication Data

US 2022/0017428 A1    Jan. 20, 2022

(30) Foreign Application Priority Data

Jul. 20, 2020 (CN) .......................... 202010699170.9

(51) Int. Cl.
 *C05D 9/02* (2006.01)
 *C05G 5/12* (2020.01)

(52) U.S. Cl.
 CPC ........ *C05D 9/02* (2013.01); *C05G 5/12* (2020.02)

(58) Field of Classification Search
 None
 See application file for complete search history.

(56) References Cited

FOREIGN PATENT DOCUMENTS

| CN | 106116910 A | * | 11/2016 | ............... C05D 9/02 |
| CN | 106134957 A | * | 11/2016 | ............... C05D 9/00 |
| CN | 106518529 A | * | 3/2017 | ............... C05G 3/80 |
| CN | 107459420 A | * | 12/2017 | ............... C05D 9/00 |
| CN | 107771608 A | * | 3/2018 | ............... C05G 3/80 |

* cited by examiner

*Primary Examiner* — Wayne A Langel
(74) *Attorney, Agent, or Firm* — Zhigang Ma

(57) ABSTRACT

A preparation method of a carbon-based selenium-enriched fertilizer for rice is disclosed. The preparation method of the carbon-based selenium-enriched fertilizer for rice includes planting a selenium-enriched plant material; collecting and concentrating a selenium-enriched extracting solution; preparing modified selenium-enriched biomass charcoal from the tertiary residues; and preparing the carbon-based selenium-enriched fertilizer. In the present disclosure, active organic selenium enriched and generated by plant is compounded with the biomass charcoal, so that the fixation and loss of the active selenium in soil are reduced, and the utilization efficiency of the selenium fertilizer is improved.

3 Claims, No Drawings

PREPARATION METHOD OF CARBON-BASED SELENIUM-ENRICHED FERTILIZER FOR RICE

TECHNICAL FIELD

The present disclosure relates to the technical field of fertilizers, and more specifically, to a preparation method of a carbon-based selenium-enriched fertilizer for rice.

BACKGROUND

About 50 percent of the world's population relies on rice to provide energy and nutrients to its staple foods. Selenium content in rice is different in different countries and regions. The selenium content in rice in the market is extremely low in major rice production and consumption countries such as Egypt, China and Thailand. It is estimated that, in rice-based countries and regions, when consuming 300 g/d rice, the selenium content of 75% of rice in the world market is insufficient to provide 70% of recommended selenium intake of the human body, thereby causing common selenium deficiency. Extremely low selenium content in food will cause some pathologic changes in the human body such as Keshan disease, Kaschin-Beck disease and more than 40 other diseases.

Natural selenium-enriched rice originates from natural high-selenium regions of China, and most of the selenium-enriched rice sold in the current market is obtained by spraying selenate or selenite onto leaves. However, autolysate of the selenium-enriched rice is low in organic selenium content, low in biological activity and large in toxic and side effects, and is hardly absorbed by the human body. The advantage of foliar spraying selenium fertilizer is that the selenium content is rapidly increased, but inorganic selenium is large in residual quantity and non-uniform in distribution. Researches have shown that, only husk of the rice obtained by foliage spray of the selenium fertilizer is selenium-enriched, and the selenium content in the rice is not significantly increased. Since the line between selenium efficacy and toxicity is narrow, it is very important to apply appropriate selenium fertilizers to different crops and different soil during agricultural biofortification.

Therefore, it is an urgent problem for those skilled in the art to provide a preparation method of carbon-based selenium-enriched fertilizer for rice.

SUMMARY

In view of the above, the present disclosure provides a preparation method of a carbon-based selenium-enriched fertilizer for rice. Active organic selenium is produced by plant enrichment and compounded with biomass charcoal, thereby decreasing fixation and loss of the active selenium in soil and increasing utilization efficiency of a selenium fertilizer.

To achieve the above purpose, the present disclosure adopts the following technical solutions.

The preparation method of the carbon-based selenium-enriched fertilizer for rice includes:

(1) planting a selenium-enriched plant material planting rank vegetation with the selenium-enriched plant material; spraying a sodium selenite solution at a concentration of 100-150 mg/kg for 20-30 L per mu (traditional Chinese unit of measure, 1 mu equals to 667 square meters) after 30-40 days of seedling growth; spraying the sodium selenite solution once every 7 days and spraying 3 times consecutively; and harvesting the rank vegetation after 2-5 months of growth;

(2) collecting and concentrating a selenium-enriched extracting solution grinding the rank vegetation harvested in the step (1) by an ultrafine grinder; putting the ground rank vegetation into a fermentation tank; adding 1-2% of microbial agent per kg of the rank vegetation; adding oxamide, wherein an addition amount of the oxamide is as follows: a carbon-nitrogen ratio of a fermented material is adjusted to be 30-35; directly and continuously aerating by an aerating pump at a frequency of 10 min each time interval for 2 min at an aeration amount of 0.5 (V/V·min); and performing fermentation;

transporting the thoroughly decomposed fermented material after one month of fermentation; pressing and filtering the transported material to obtain primary filtrate and primary residues; adding deionized water into the primary residues according to a volume ratio of 1:1, followed by pressing and filtering to obtain secondary filtrate and secondary residues; then adding the deionized water into the secondary residues according to a volume ratio of 1:1, followed by pressing and filtering to obtain tertiary filtrate and tertiary residues; mixing the primary filtrate, the secondary filtrate and the tertiary filtrate so as to obtain an extracting solution; and heating and concentrating the extracting solution to ⅓ of the original volume so as to obtain a selenium-enriched concentrated solution;

(3) preparing modified selenium-enriched biomass charcoal from the tertiary residues mixing the tertiary residues obtained in the step (2) with perlite and rice straws according to a volume ratio of 1:0.5:10; carrying out a low-temperature carbonization reaction on the mixture in a biomass carbonization device; setting a temperature at 300-350° C.; performing an anaerobic carbonization treatment for 2-5 hours; and spraying 1 mol/L of dilute sulphuric acid into the treated mixture to enable a pH value to be 6-7, to prepare the modified selenium-enriched biomass charcoal;

(4) preparing the carbon-based selenium-enriched fertilizer spraying the selenium-enriched concentrated solution obtained in the step (2) into the modified selenium-enriched biomass charcoal prepared in the step (3) to enable a selenium content in the modified selenium-enriched biomass charcoal to be up to 100 mg/kg; and grinding the biomass charcoal so as to obtain 0.5-1 mm of modified selenium-enriched biomass charcoal powder granules;

uniformly mixing 4 parts of the modified selenium-enriched biomass charcoal powder granules, 4 parts of a turtle dove fermented organic fertilizer, 1.5 parts of a compound fertilizer with a N-P-K ratio of 17:17:17, 0.2 part of sodium-based clay, 0.2 part of a modified gelatinization powder and 0.1 part of a lignocellulose by a mixer; transporting the mixture into a granulator; and granulating the mixture to obtain the carbon-based selenium-enriched fertilizer having a particle size of 1-6 mm.

Further, the rank vegetation in the step (1) is pakchoi cabbage, bengal waterdropwort herb or buddleia.

Further, in the step (3), a particle size of the perlite is 0.2-1 mm; and a length of the rice straws is 3-8 mm.

Through the above technical solutions, compared with the prior art, the present disclosure provides a preparation method of the carbon-based selenium-enriched fertilizer for rice. The trace element selenium is absorbed and enriched by plants in accordance with a biological selenium enrichment principle; and the selenium and the biomass charcoal are compounded and granulated by microbial fermentation so as to form the active substances that are easily absorbed by plants. Therefore, the selenium is fully utilized. Specifically:

(1) The organic selenium in some products is directly produced from selenium-containing materials in the market; the crop absorption and utilization rate is low; even the selenium cannot be utilized. The selenium is absorbed and enriched by the plants in the present disclosure; the filtrate is prepared by grinding and filtering; soluble organic selenium compounds and selenate materials are formed by deep microbial decomposition; and then available selenium that is easily absorbed by the crops is formed.

(2) If the selenium fertilizer is directly applied to soil, the selenium fertilizer is easily adsorbed by a complex of soil clay minerals or subjected to coordination bonding, thereby decreasing efficacy. In the present disclosure, the soluble organic selenium compounds are adsorbed by taking the charcoal as a carrier, to form a carbon-based granule complex, thereby decreasing the fixation effect of the soil on the selenium.

(3) Paddy soil is in a flooded state and has high reducibility, and the selenium is reduced to a low-efficacy form. In the present disclosure, the biomass charcoal granules can improve permeability of the paddy soil, thereby increasing conversion of high-valent selenium and increasing selenium bio-availability.

(4) If 40 kg of the carbon-based selenium-enriched fertilizer in the present disclosure is applied per mu, the selenium content in the paddy soil is maintained at 60 μg/kg, and the highly-selenium-enriched rice standard of 0.15-0.3 mg/kg is met.

DETAILED DESCRIPTION

The technical solution in embodiments of the present disclosure will be clearly and fully described below. Apparently, the described embodiments are merely part of the embodiments of the present disclosure, not all of the embodiments. Based on the embodiments in the present disclosure, all other embodiments obtained by those ordinary skilled in the art without contributing creative labor will belong to the protection scope of the present disclosure.

Sodium selenite was purchased from Zhengzhou Chengwang Chemical Food Additive Co., Ltd.; a microbial agent (with a ratio of bacteria to trichoderma sp to actinomycetes to saccharomycetes of 1:1:2:1) was purchased from Hefei Beinong Biotechnology Co., Ltd.; a turtle dove fermented organic fertilizer was purchased from Shandong Jingyang Organic Fertilizer Co., Ltd.; sodium-based clay was purchased from Tianyuan Non-metallic Product Co., Ltd.; modified gelatinization powder was purchased from Guangxi Tiansheng Science and Technology Co., Ltd.; and lignocellulose was purchased from Tianyuan Non-metallic Product Co., Ltd.

Embodiment 1

A preparation method of a carbon-based selenium-enriched fertilizer for rice includes:

(1) Planting a Selenium-Enriched Plant Material

Pakchoi cabbage was planted with the selenium-enriched plant material; a sodium selenite solution at a concentration of 150 mg/kg was sprayed for 20 L per mu after 30 days of seedling growth; the sodium selenite solution was sprayed once every 7 day and was sprayed 3 times consecutively; and the pakchoi cabbage was harvested after 2 months of growth;

(2) Collecting and Concentrating a Selenium-Enriched Extracting Solution

The pakchoi cabbage harvested in the step (1) was ground by an ultrafine grinder; the ground pakchoi cabbage was added into a fermentation tank; 2% of a microbial agent was added into per kg of the pakchoi cabbage; oxamide was added, wherein an addition amount of the oxamide was as follows: a carbon-nitrogen ratio of a fermented material was adjusted to be 30; the fermentation tank was directly and continuously aerated by an aerating pump at a frequency of 10 min each time interval for 2 min at an aeration amount of 0.5 (V/V·min); and fermentation was performed;

The thoroughly decomposed fermented material was transported after one month of the fermentation; the transported material was pressed and filtered to obtain primary filtrate and primary residues; deionized water was added into the primary residues according to a volume ratio of 1:1; the primary residues were pressed and filtered to obtain secondary filtrate and secondary residues; then the deionized water was added into the secondary residues according to a volume ratio of 1:1; the secondary residues were pressed and filtered to obtain the tertiary filtrate and tertiary residues; the primary filtrate, the secondary filtrate and the tertiary filtrate were mixed so as to obtain an extracting solution; and the extracting solution was heated and concentrated to ⅓ of the original volume so as to obtain a selenium-enriched concentrated solution;

(3) Preparing Modified Selenium-Enriched Biomass Charcoal from the Tertiary Residues The tertiary residues obtained in the step (2) were mixed with perlite (0.2-1 mm) and rice straws (3-8 mm) according to a volume ratio of 1:0.5:10; a low-temperature carbonization reaction was carried out on the mixture in a biomass carbonization device; a temperature was set at 300° C.; an anaerobic carbonization treatment was performed for 2 hours; and 1 mol/L of dilute sulphuric acid was sprayed into the treated mixture to enable a pH value to be 6-7, to prepare the modified selenium-enriched biomass charcoal;

(4) Preparing the Carbon-Based Selenium-Enriched Fertilizer

The selenium-enriched concentrated solution obtained in the step (2) was sprayed into the modified selenium-enriched biomass charcoal prepared in the step (3); the selenium content in the modified selenium-enriched biomass charcoal was 100 mg/kg; and the biomass charcoal was ground so as to obtain 0.5-1 mm of modified selenium-enriched biomass charcoal powder granules;

4 parts of the modified selenium-enriched biomass charcoal powder granules, 4 parts of a turtle dove fermented organic fertilizer, 1.5 parts of a compound fertilizer with a N-P-K ratio of 17:17:17, 0.2 part of sodium-based clay, 0.2 part of modified gelatinization powder and 0.1 part of a lignocellulose were uniformly mixed by a mixer; the mixture was transported into a granulator; and the mixture was granulated, thereby obtaining the carbon-based selenium-enriched fertilizer with a particle size of 1-6 mm.

Embodiment 2

A preparation method of a carbon-based selenium-enriched fertilizer for rice includes:

(1) Planting a selenium-enriched plant material

Buddleia was planted with the selenium-enriched plant material; a sodium selenite solution at a concentration of 100 mg/kg was sprayed by 30 L per mu after 35 days of seedling growth; the sodium selenite solution was sprayed once every 7 days and was sprayed 3 times consecutively; and the buddleia was harvested after 5 months of growth;

(2) Collecting and concentrating a selenium-enriched extracting solution

The buddleia harvested in the step (1) was ground by an ultrafine grinder; the ground buddleia on was added into a fermentation tank; 1.5% of a microbial agent was added into per kg of the buddleia; oxamide was added, wherein an addition amount of the oxamide was as follows: a carbon-nitrogen ratio of a fermented material was adjusted to be 35; the fermentation tank was directly and continuously aerated by an aerating pump at a frequency of 10 min each time interval for 2 min at an aeration amount of 0.5 (V/V·min); and fermentation was performed;

The thoroughly decomposed fermented material was transported after one month of the fermentation; the transported material was pressed and filtered to obtain primary filtrate and primary residues; deionized water was added into the primary residues according to a volume ratio of 1:1; the primary residues were pressed and filtered to obtain secondary filtrate and secondary residues; then the deionized water was added into the secondary residues according to a volume ratio of 1:1; the secondary residues were pressed and filtered to obtain the tertiary filtrate and tertiary residues; the primary filtrate, the secondary filtrate and the tertiary filtrate were mixed so as to obtain an extracting solution; and the extracting solution was heated and concentrated to ⅓ of the original volume so as to obtain a selenium-enriched concentrated solution;

(3) Preparing modified selenium-enriched biomass charcoal from the tertiary residues The tertiary residues obtained in the step (2) were mixed with perlite (0.2-1 mm) and rice straws (3-8 mm) according to a volume ratio of 1:0.5:10; a low-temperature carbonization reaction was carried out on the mixture in a biomass carbonization device; a temperature was set at 350° C.; an anaerobic carbonization treatment was performed for 5 hours; and 1 mol/L of dilute sulphuric acid was sprayed into the treated mixture to enable a pH value to be 6-7, to prepare the modified selenium-enriched biomass charcoal was prepared;

(4) Preparing the carbon-based selenium-enriched fertilizer

The selenium-enriched concentrated solution obtained in the step (2) was sprayed into the modified selenium-enriched biomass charcoal prepared in the step (3); the selenium content in the modified selenium-enriched biomass charcoal was 100 mg/kg; and the biomass charcoal was ground so as to obtain 0.5-1 mm of modified selenium-enriched biomass charcoal powder granules;

4 parts of the modified selenium-enriched biomass charcoal powder granules, 4 parts of a turtle dove fermented organic fertilizer, 1.5 parts of a compound fertilizer with a N-P-K ratio of 17:17:17, 0.2 part of sodium-based clay, 0.2 part of modified gelatinization powder and 0.1 part of a lignocellulose were uniformly mixed by a mixer; the mixture was transported into a granulator; and the mixture was granulated, thereby obtaining the carbon-based selenium-enriched fertilizer with a particle size of 1-6 mm.

Embodiment 3

A preparation method of a carbon-based selenium-enriched fertilizer for rice includes the following specific steps:

(1) Planting a selenium-enriched plant material

Bengal waterdropwort herb was planted with the selenium-enriched plant material; a sodium selenite solution at a concentration of 130 mg/kg was sprayed by 25 L per mu after 40 days of seedling growth; the sodium selenite solution was sprayed once every 7 days and was sprayed for 3 times consecutively; and the bengal waterdropwort herb was harvested after 4 months of growth;

(2) Collecting and concentrating a selenium-enriched extracting solution

The bengal waterdropwort herb harvested in the step (1) was ground by an ultrafine grinder; the bengal waterdropwort herb was added into a fermentation tank; 1% of a microbial agent was added into per kg of the bengal waterdropwort herb; oxamide was added, wherein an addition amount of the oxamide was as follows: a carbon-nitrogen ratio of a fermented material was adjusted to be 32; the fermentation tank was directly and continuously aerated by an aerating pump at a frequency of 10 min each time interval for 2 min at an aeration amount of 0.5 (V/V·min); and fermentation was performed;

The thoroughly decomposed fermented material was transported after one month of the fermentation; the transported material was pressed and filtered to obtain primary filtrate and primary residues; deionized water was added into the primary residues according to a volume ratio of 1:1; the primary residues were pressed and filtered to obtain secondary filtrate and secondary residues; then the deionized water was added into the secondary residues according to a volume ratio of 1:1; the secondary residues were pressed and filtered to obtain the tertiary filtrate and tertiary residues; the primary filtrate, the secondary filtrate and the tertiary filtrate were mixed so as to obtain an extracting solution; and the extracting solution was heated and concentrated to ⅓ of the original volume so as to obtain a selenium-enriched concentrated solution;

(3) Preparing modified selenium-enriched biomass charcoal from the tertiary residues The tertiary residues obtained in the step (2) were mixed with perlite (0.2-1 mm) and rice straws (3-8 mm) according to a volume ratio of 1:0.5:10; a low-temperature carbonization reaction was carried out on the mixture in a biomass carbonization device; a temperature was set at 320° C.; an anaerobic carbonization treatment was performed for 3 hours; and 1 mol/L of dilute sulphuric acid was sprayed into the treated mixture to enable a pH value to be 6-7, to prepare the modified selenium-enriched biomass charcoal was prepared;

(4) Preparing the carbon-based selenium-enriched fertilizer

The selenium-enriched concentrated solution obtained in the step (2) was sprayed into the modified selenium-enriched biomass charcoal prepared in the step (3); the selenium content in the modified selenium-enriched biomass charcoal was 100 mg/kg; and the biomass charcoal was ground so as to obtain 0.5-1 mm of modified selenium-enriched biomass charcoal powder granules;

4 parts of the modified selenium-enriched biomass charcoal powder granules, 4 parts of a turtle dove fermented organic fertilizer, 1.5 parts of a compound fertilizer with a N-P-K ratio of 17:17:17, 0.2 part of sodium-based clay, 0.2 part of modified gelatinization powder and 0.1 part of a lignocellulose were uniformly mixed by a horizontal mixer; the mixture was transported into a granulator; and the mixture was granulated, thereby obtaining the carbon-based selenium-enriched fertilizer with a particle size of 1-6 mm.

Fertilizer Efficiency Test

Rice was planted under the same test condition. The variety of rice for test was Jia 58. A compound fertilizer (with an N-P-K ratio of 15:15:15) serving as a base fertilizer was applied to paddy soil at a dosage of 30 kg per mu, and 46% of urea serving as a panicle fertilizer was applied at a dosage of 8 kg per mu. The carbon-based selenium-enriched fertilizer prepared in the present disclosure (embodiments 1, 2 and 3) and a commercial selenium-enriched soil improvement agent (purchased from Changsha Selenium-enriched Agricultural Science and Technology Co. Ltd.) were respectively applied as the base fertilizer at a dosage of 40 kg per mu; paddy soil without fertilization served as blank control; and field planting test for rice was conducted. Selenium content of brown rice applied with different fertilizers was tested after rice test after one growth period was ended. Results were shown in Table 1.

TABLE 1

|  | Rice yield (kg/mu) | Selenium content of brown rice (mg/kg) |
| --- | --- | --- |
| Carbon-based selenium-enriched fertilizer prepared in embodiment 1 | 494 | 0.25 |
| Carbon-based selenium-enriched fertilizer prepared in embodiment 2 | 501 | 0.28 |
| Carbon-based selenium-enriched fertilizer prepared in embodiment 3 | 489 | 0.22 |
| Commercial selenium-enriched soil improvement agent | 477 | 0.12 |
| Blank control | 456 | 0.028 |

The selenium content of brown rice applied with the commercial selenium-enriched soil improvement agent reached 0.12 mg/kg; and the yield was increase by 4.6% compared with the control field. The average selenium content of brown rice applied with the carbon-based selenium-enriched fertilizer (embodiments 1, 2 and 3) reached 0.25 mg/kg; and the yield was averagely increased by 8.3% compared with the control field. It is indicated that, the carbon-based selenium-enriched fertilizer prepared in the present disclosure effectively increases the selenium content in the rice, has a significant yield increasing effect, is cheap in price, and can significantly improve physical and chemical properties of the soil.

The above description of the disclosed embodiments enables those skilled in the art to realize or use the present disclosure. Many modifications to these embodiments will be apparent to those skilled in the art. The general principle defined herein can be realized in other embodiments without departing from the spirit or scope of the present disclosure. Therefore, the present disclosure will not be limited to these embodiments shown herein, but will conform to the widest scope consistent with the principle and novel features disclosed herein.

We claim:

1. A preparation method of a carbon-based selenium-enriched fertilizer for rice, comprising:

planting rank vegetation with selenium-enriched plant material; spraying a sodium selenite solution at a concentration of 100-150 mg/kg for 20-30 L per mu (traditional Chinese unit of measure, 1 mu equals to 667 square meters) after 30-40 days of seedling growth; spraying the sodium selenite solution once every 7 days and spraying 3 times consecutively; and harvesting the rank vegetation after 2-5 months of growth;

grinding the harvested rank vegetation by ultrafine grinder; placing the ground rank vegetation into a fermentation tank; adding 1-2‰ of microbial agent per kg of the rank vegetation; adding an oxamide, wherein an addition amount of the oxamide is as follows: a carbon-nitrogen ratio of a fermented material is adjusted to be 30-35; directly and continuously aerating, bye an aerating pump, at a frequency of 10 min each time interval for 2 min with an aeration amount of 0.5 (V/V·min); and performing a fermentation;

transporting the fermented material after one month of the fermentation; pressing and filtering the transported material to obtain a primary filtrate and primary residues; adding a deionized water into the primary residues according to a volume ratio of 1:1, followed by pressing and filtering to obtain secondary filtrate and secondary residues; then adding the deionized water into the secondary residues according to a volume ratio of 1:1, followed by pressing and filtering to obtain tertiary filtrate and tertiary residues; mixing the primary filtrate, the secondary filtrate and the tertiary filtrate so as to obtain an extracting solution; and heating and concentrating the extracting solution to ⅓ of an original volume so as to obtain a selenium-enriched concentrated solution;

mixing the tertiary residues with perlite and rice straws according to a volume ratio of 1:0.5:10; carrying out a low-temperature carbonization reaction on the mixture in a biomass carbonization device; setting a temperature at 300-350° C.; performing an anaerobic carbonization treatment for 2-5 hours; and spraying 1 mol/L of dilute sulphuric acid into the treated mixture to enable a pH value to be 6-7, to obtain the modified selenium-enriched biomass charcoal;

spraying the selenium-enriched concentrated solution into the modified selenium-enriched biomass charcoal to enable a selenium content in the modified selenium-enriched biomass charcoal to be up to 100 mg/kg; and grinding the biomass charcoal so as to obtain 0.5-1 mm of modified selenium-enriched biomass charcoal powder granules;

uniformly mixing 4 parts of the modified selenium-enriched biomass charcoal powder granules, 4 parts of a turtle dove fermented organic fertilizer, 1.5 parts of a compound fertilizer with an N-P-K ratio of 17:17:17, 0.2 part of sodium-based clay, 0.2 part of a modified gelatinization powder and 0.1 part of a lignocellulose by a mixer; transporting the mixture into a granulator; and granulating the mixture to obtain the carbon-based selenium-enriched fertilizer with a particle size of 1-6 mm.

2. The preparation method of the carbon-based selenium-enriched fertilizer for rice of claim 1, wherein the rank vegetation comprises pakchoi cabbage, bengal waterdropwort herb or buddleia.

3. The preparation method of the carbon-based selenium-enriched fertilizer for rice of claim 1, wherein a particle size of the perlite is 0.2-1 mm and a length of the rice straws is 3-8 mm.

* * * * *